United States Patent Office 2,842,430
Patented July 8, 1958

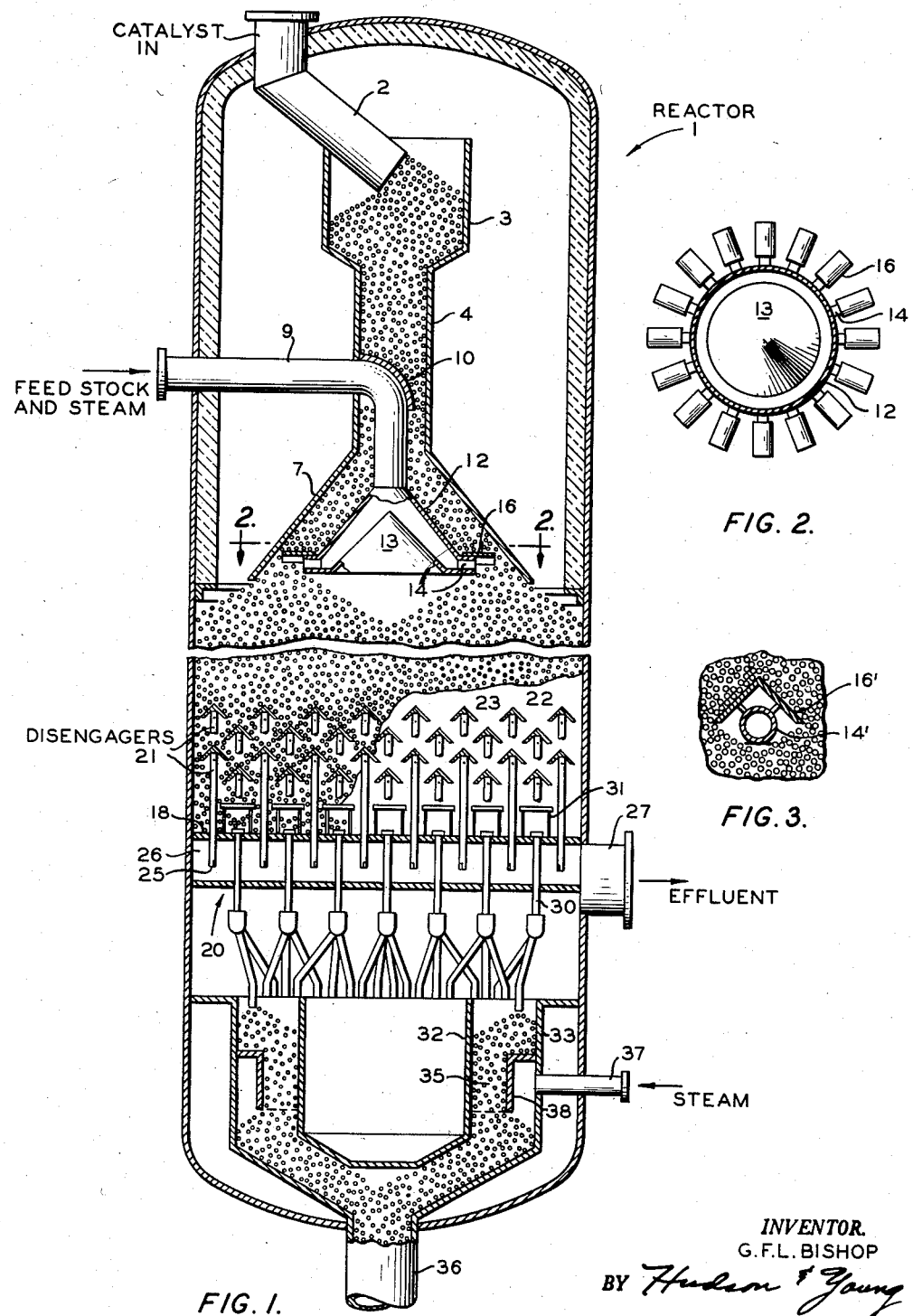

2,842,430

FEEDSTOCK INJECTOR

George F. L. Bishop, Woods Cross, Utah, assignor to Phillips Petroleum Company, a corporation of Delaware Application May 6, 1955, Serial No. 506,651

7 Claims. (Cl. 23—288)

This invention is directed to an improved means for introducing a hydrocarbon feedstock and catalyst into a hydrocarbon conversion system.

In the catalytic conversion of hydrocarbons one means of effecting contact between the feedstock and catalyst involves passing the two counter-currently through a reactor, the catalyst gravitating down through the vessel in the form of a moving bed. In one modification common to the art, the feedstock is sprayed or atomized into an opening within a freely falling curtain of the catalyst particles. One disadvantage of this method, as pointed out in U. S. 2,492,998, is the fact that some of the atomized feedstock penetrates the curtain of catalyst and sticks to the reactor wall, resulting in the deposition of coke thereon. One solution to this problem is to inject the feedstock into an open space or spaces within the interior of the compact catalyst bed as shown, for example, by U. S. 2,592,121. This, however, requires that the feedstock be vaporized beforehand so as to be injected in gaseous form. Where a topped crude is to be cracked it is impossible to vaporize it beforehand without thermally cracking and coking the asphaltic portion thereof. The present invention provides means whereby the feedstock may be injected in liquid form into a downwardly gravitating catalyst mass without coking on the walls of the reactor.

The principal object of the present invention is to provide a means for introducing a hydrocarbon feedstock and a moving bed type of catalyst into a reactor in such a manner as to avoid coking on the reactor walls. A further object is the provision of means for effecting even distribution of combined liquid-vapor charge into a downwardly moving bed of catalyst.

According to the present invention a feeder is provided for distributing a liquid-vapor feedstock into a downwardly moving bed of particulate catalyst, the feeder comprising radial outlet pipes branching from a single inlet conduit and having their outlet ends hooded to provide solids-free spaces into which the reactants are introduced. The periphery of the solids-free spaces is surrounded by a compact ring of catalyst particles so as to shield the reactor walls from coking.

The invention can best be illustrated by referring to the accompanying drawings wherein Figure 1 represents a vertical cross section of the upper portion of the reactor and the feeding mechanism, Figure 2 is a plan view of the feeder taken along line 2—2 of Figure 1, and Figure 3 is an end view of one type of feeder outlet.

Referring to Figures 1, 2 and 3 together, regenerated catalyst in the form of pellets or beads is introduced into the reactor 1 via downleg 2, hopper 3 and downleg 4, flowing out from cone 7 into the cylindrical portion of reactor 1. Combined liquid and vapor hydrocarbons, along with steam, is introduced via conduit 9 into the reactor, said conduit entering the side of downleg 4 and then curving at a right angle so as to extend into the lower portion of cone 7. The elbow of this feed conduit is protected against erosion by means of an erosion-resistant patch 10. The feed materials are passed from conduit 9 into the section defined by inner cones 12 and 13, and thence out via radial outlets 14. These outlets may be of the same length or may alternate in short and long lengths to distribute the feed more evenly. Perforations may be used in between the radial outlets. The undersides of the outlets 14 may be slotted or perforated for further distribution purposes, as desired. To prevent outlets 14 from opening directly into the solids (which results in a high pressure drop) I have mounted a shield or covering 16 over the outlet end of these radially mounted conduits which deflects catalyst particles and forms a sheltered space underneath for discharge of feedstock. This space allows unrestricted entry of the feed materials into the cracking zone and a better distribution thereof over the solids.

The cone 7, in particular, has an angle greater than the angle of repose of the solids (30–40°) in order to produce the desired downward flow of solids thereunder.

The falling catalyst forms a compact bed supported by a horizontal grid plate 18. A plurality of spaced vapor disengager tubes 21 extend through grid 18 with their lower ends terminating a short distance below it. Each disengager is covered by an inverted cup-shaped member 22 or angle iron which acts as an umbrella, permitting the vapors, along with some catalyst fines, to be drawn in through orifices 23 without obstruction from the main catalyst mass. Disengagers 21 are notched near their base to form discharge ports 25 through which vapors are discharged into the vapor space 26 between grid 18 and lower plate 20 for passage through effluent nozzle 27 to suitable fractionating means not shown.

Catalyst is drawn off from the catalyst bed into the underlying stripping section through a plurality of downcomer pipes 30. Downcomers 30 are partly covered by members 31 to provide a funneling action for the passing of catalyst particles thereto and to prevent bridging of the catalyst bed over the tops of the downcomers.

The stripping section consists mainly of two concentric hoppers 32 and 33, the intervening space being divided into a number of cells 35. Each catalyst downcomer pipe 30 discharges into an individual cell. Inner hopper 32 tapers to a conical base as does hopper 33, the latter discharging into standpipe 36 for passage into the regeneration zone. Catalyst particles pass through the cells 35 as a plurality of compact columns and are stripped therein by steam entering the reactor through line 37 and discharging into hopper 33. Baffle ring 38 projecting from the inner wall of cylinder 33 forces the incoming steam downwardly and toward the center of cells 35; from this point it flows up through the individual cells. Stripped catalyst is withdrawn from the reactor into standpipe 36. The fines, together with stripped hydrocarbon vapors, are entrained by the stripping steam passing through the several cells and collect, in part, within inner hopper 32. The latter may, if necessary, be periodically evacuated by such means as described in Serial No. 490,771, same assignee.

In a preferred embodiment of the invention reactor 1 is a catalytic cracking unit, the feedstock is a topped crude, and the catalyst is acid-treated clay. The unit may, however, be used to effect catalytic reforming, dehydrogenation, desulfurization, etc.

While I have illustrated and described specific forms of the invention in the drawings and specification, it is to be understood that these are illustrative, not limiting, and that various modifications may be made without departing from the spirit of the invention.

I claim:

1. In a hydrocarbon conversion unit, in combination, a conduit extending into the upper portion of the unit for the admission of catalyst particles thereto, a feed inlet pipe extending through the wall of said unit into said conduit and depending therein, said conduit and said feed inlet pipe defining an annular space through which a stream of catalyst particles may be fed downward in the form of a compact moving bed, said feed inlet pipe terminating at its lower end in a spray nozzle within the discharge end of said conduit, said conduit tapering outwardly at its said discharge end to form a cone-shaped outlet, the base angle of said cone-shaped outlet being greater than the angle of repose of the catalyst particles so as to permit said stream of catalyst particles to move past said spray nozzle, said nozzle comprising a pair of concentric cones within said cone-shaped outlet, said pair of concentric cones separated by a second annular space which communicates with said feed inlet pipe, the inner cone serving to deflect incoming feed toward a plurality of horizontally-directed radial outlet conduits positioned in the lower periphery of said second annular space, and a deflector baffle projecting outwardly over each of said nozzle outlet conduits so as to form a sheltered niche beneath said baffle and deflect downcoming catalyst particles from said outlet conduits and facilitate the spraying of said feedstock into said downcoming catalyst particles.

2. Apparatus of claim 1 wherein said nozzle outlet conduits have alternately short and long lengths.

3. Apparatus of claim 1 wherein said nozzle outlet conduits all have the same length.

4. Apparatus of claim 1 wherein said nozzle outlet conduits have outlets at their ends.

5. Apparatus of claim 1 wherein said nozzle outlet conduits have perforations on the underside thereof.

6. Apparatus of claim 1 wherein said nozzle outlet conduits have perforations at adjacent side wall portions.

7. In a hydrocarbon conversion unit comprising, in combination, a conduit extending from the exterior of said unit into the upper portion thereof for the admission of catalyst particles thereto, a feed inlet pipe depending within said conduit and together with the latter defining an annular space through which said catalyst particles are permitted to flow downwardly in the form of a compact moving bed, said conduit tapering outwardly at its lower end to form a first cone-shaped outlet, said feed inlet pipe terminating within said first cone-shaped outlet and similarly tapering outwardly at its closed lower end to form a second cone-shaped outlet, said lower ends of said conduit and feed inlet pipe defining a second annular space communicating with said first annular space, a plurality of horizontally-directed outlet conduits radiating from the lower periphery of said second cone-shaped outlet into said second annular space, and a deflector baffle projecting outwardly over each of said horizontally-directed outlet conduits so as to form a sheltered niche beneath said baffle and deflect downcoming catalyst particles in said second annular space from said horizontally-directed outlet conduits to facilitate introduction of feedstock from said feed inlet pipe into said downcoming catalyst particles.

References Cited in the file of this patent
UNITED STATES PATENTS

| | | |
|---|---|---|
| 2,439,372 | Simpson | Apr. 6, 1948 |
| 2,663,677 | Savage et al. | Dec. 22, 1953 |
| 2,766,189 | Shimp | Oct. 9, 1956 |